Patented Nov. 11, 1947

2,430,647

UNITED STATES PATENT OFFICE 2,430,647

PROCESS OF TREATING BRICK

Harvey S. Rader, Palmerton, Pa.; Eva Rader executrix of said Harvey S. Rader, deceased No Drawing. Application November 4, 1944, Serial No. 562,029

1 Claim. (Cl. 117—123)

This invention generally relates to the treating of certain materials of both organic and inorganic character with a view to improving certain characteristics thereof and more particularly is directed to an improved process of treating metals such as copper, brass, zinc, aluminum, magnesium and steel for the purpose of toughening and hardening the same and such non-metallic materials as wood, rubber and firebrick.

The primary object of the present invention is to provide an improved process of treating the above stated metals whereby such metals are given an improved elasticity and greater resistance to corrosion.

Another object of the invention is to provide a process which is applicable to certain inorganic, non-metallic materials as well as to certain organic materials to change certain physical characteristics thereof whereby such materials are given longer life in the services to which they may be put by reason of their acquiring an increased toughness, resistance to heat and abrasion and greater strength.

In carrying out the present invention in connection with the treatment of the several different materials specified, use is made of a basic composition which has been found essential in producing the desired results. This basic composition is a commercial product which is marketed under the name "85% Magnesia Cement." Such composition comprises a mixture of 85% by weight of basic magnesium carbonate, commonly called "magnesia" and 15% by weight of finely comminuted asbestos.

In association or in combination with the basic ingredient above set forth, use is made of desirable proportions of potassium cyanide, boric acid, potassium nitrate or saltpeter, mercury, vinegar, and zinc oxide.

Broadly stated the process of the present invention is carried out by first mixing the magnesia cement in a prescribed proportion of water and this is allowed to stand for approximately twelve hours, after which it is brought to a boil in a suitable receptacle. The use of soft water is preferred.

The additional ingredients are then added to the water and magnesia cement mixture and the material to be treated is immersed in the solution or mixture, in cold condition and boiled in the mixture for a period of from thirty minutes to one hour, the time of boiling being regulated according to the use to which the material is to be put and the degree of physical change desired.

In carrying out the present invention the following specific illustrations are given for treating the specified metals.

For the treatment of brass and copper bodies, the processing preparation is made up by adding to approximately four quarts of water, three ounces of the 85% magnesia cement previously referred to. This mixture is allowed to stand for about twelve hours. The water cement mixture is then brought to a boil and then has added thereto, fifteen grains of potassium nitrate or saltpeter, thirty grains of potassium cyanide and one and a half ounces of boric acid. The copper or brass body is then placed cold in the mixture and is subjected to boiling therein for a period of from thirty minutes to one hour.

When the copper body under treatment is to be used for outside work or in locations where it will be subjected to the elements, the foregoing mixture has added thereto, one half ounce of metallic or liquid mercury and two ounces of vinegar.

In connection with the treating of bodies of zinc, aluminum and magnesium, a slight variation is made in the above set forth formula in that the potassium nitrate is not employed and only a little over half the quantity of potassium cyanide is used. In other words, for the preparation of the treating solution for zinc, aluminum and magnesium bodies, three ounces of the 85% magnesia cement is added to four quarts of water and the mixture is allowed to stand for about twelve hours. This mixture is then brought to a boil and has added thereto, one and a half ounces of boric acid and sixteen grains of potassium cyanide.

The zinc, aluminum or magnesium body is immersed cold in the mixture and subjected to boiling for a period of from thirty minutes to one hour.

In connection with the treating of aluminum and magnesium bodies, use may be made of heavy magnesium oxide, U. S. P., with satisfactory results, in place of the magnesium carbonate which forms a part of the magnesia cement.

For the treatment of tools of steel, such as picks, chisels, hammers and the like the same initial mixture of magnesia cement and water is made in the proportion of three ounces of the cement to four quarts of water, preferably soft water as previously stated. After allowing this mixture to stand for approximately twelve hours there is added thereto, one ounce of potassium nitrate, one quarter ounce of potassium cyanide. This solution or mixture is boiled for fifteen minutes.

The steel bodies are then heated to a cherry red and tempered in this solution by immersion therein while in the red-hot condition.

For the treatment of steel bodies or material of light construction, such as steel wire and the like, the water and magnesia cement mixture is made in the proportions of six ounces of the cement to eight quarts of water. This mixture is allowed to stand for approximately twelve hours and is then brought to a boil. There is then added to the mixture one pound of zinc oxide, three ounces of boric acid, and one and a half ounces of potassium cyanide. The steel wire or other light steel body is immersed cold in the mixture and boiled for approximately two and a half hours under a pressure of approximately 20 lbs. to the square inch.

In referring to the treatment of copper and copper articles reference is had to copper of the ordinary grades used in commerce. Such copper is not absolutely pure but is known in commerce as "commercially pure copper" and is the variety commonly used in electrical work.

The same applies with regard to the other metals referred to such as the aluminum, zinc and magnesium. Brass and steel, being alloys, are benefited by treatment with the mixtures herein set forth without regard to the type of alloy.

While it is not definitely understood just what chemical action is brought about in the metals treated according to the process herein set forth, to produce an increased elasticity and strength as well as resistance to corrosion in the metal, spectrographic analysis of the metals after such treatment reveals the presence of the boron, as the trioxide, forming a lattice-like bond between the molecules of the metal. This chemical is produced at a temperature of about 160° F. and is stable in the structure, up to a temperature of as much as 3,400° F.

For the treatment of wood, about three ounces of magnesia cement is soaked in four quarts of soft water for approximately twelve hours. This mixture is then brought to a boil and there is added thereto about one and a half ounces of boric acid, fifteen grains of potassium nitrate, and one-quarter ounce of potassium cyanide.

The wood body is immersed in this solution and boiled therein for about thirty minutes.

For the treatment of rubber according to the present process whereby the natural desirable physical characteristics of such material are greatly accentuated, the basic mixture of magnesia cement in water is prepared in the proportion of about three ounces of the magnesia cement to four quarts of soft water, the magnesia cement being allowed to soak for a period of about twelve hours. The mixture is then brought to a boil and has added thereto, one and a half ounces of boric acid, one-quarter ounce of potassium cyanide, and thirty grains of sulphur in the form of the ordinary well-known "flower" of sulphur. The rubber is immersed in this mixture and boiled therein for approximately thirty minutes.

Fire-brick when treated according to the present process shows upon microscopic examination to have the particles thereof more firmly latticed or bonded together and the brick so treated is found to be of greater strength and to have a greater resistance to heat, abrasion and spalling, than untreated bricks.

Equally good improved results are obtained in connection with the treatment of the commercially known cork brick which is formed from diatomaceous earth and ordinary building brick when treated according to the present process becomes a great deal less absorbent of water.

The treatment of fire-brick is carried out by first preparing the basic mixture of magnesia cement and water in the proportion of about six ounces of cement to eight quarts of soft water, which mixture is allowed to stand for about twelve hours. This mixture is then brought to a boil and has added thereto, forty-five grains of potassium cyanide, one and a half ounces of potassium nitrate, six ounces of boric acid, and one ounce of pure barium hydroxide.

The brick is immersed in this solution and is boiled therein for approximately one hour.

The treatment of wood according to the process herein disclosed brings about an increased toughness and makes the wood more resistant to moisture so that the breaking down of the cellular structure and the rotting thereof is materially retarded. In addition, the wood when so treated becomes more resistant to heat and therefore its use in building construction will result in a material reduction in the development of fires.

According to tests made upon treated and untreated specimens of wood, it was found that the treated specimen withstood a temperature of approximated 280° C. for forty-eight hours as against the reduction of the untreated body to a charred mass. Actual tests have also shown that wood treated by the present process is increased in strength approximately 36%.

Rubber of a poor grade such as that used for making tires for tricycles, baby carriages and toy wagons, when treated in accordance with the process herein set forth, showed an increased toughness, greater elasticity and improved wearing qualities.

I claim:

The process of treating brick, which comprises boiling the brick for a predetermined period of time in an aqueous mixture containing magnesium carbonate, asbestos, potassium cyanide, potassium nitrate, boric acid, and barium hydroxide.

HARVEY S. RADER.

REFERENCES CITED

The following references are of record in the file of this patent:

UNITED STATES PATENTS

| Number | Name | Date |
|--------|------|------|
| 865,033 | Haley | Sept. 3, 1907 |
| 1,414,609 | Wheeler | May 2, 1922 |
| 1,738,976 | Vivas | Dec. 10, 1929 |
| 2,331,868 | Swenson | Oct. 12, 1943 |